2 Sheets--Sheet 1.
C. DRESCHER & H. BLOCH.
Distance and Fare Registers.
No. 157,587. Patented Dec. 8, 1874.
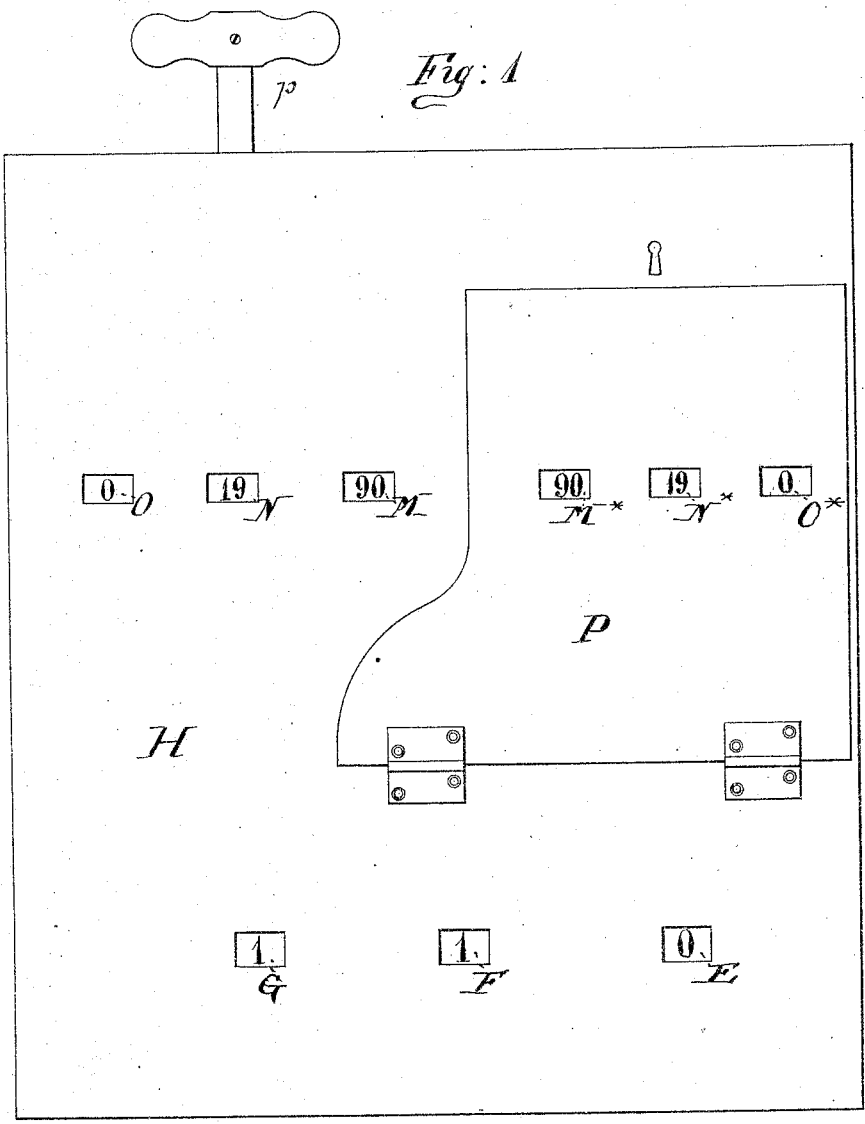
Fig: 1
Witnesses:
Chas Raettig.
E. C. Webb.
Inventors:
C. Drescher
H. Bloch
by their attorney
A. v. Briesen

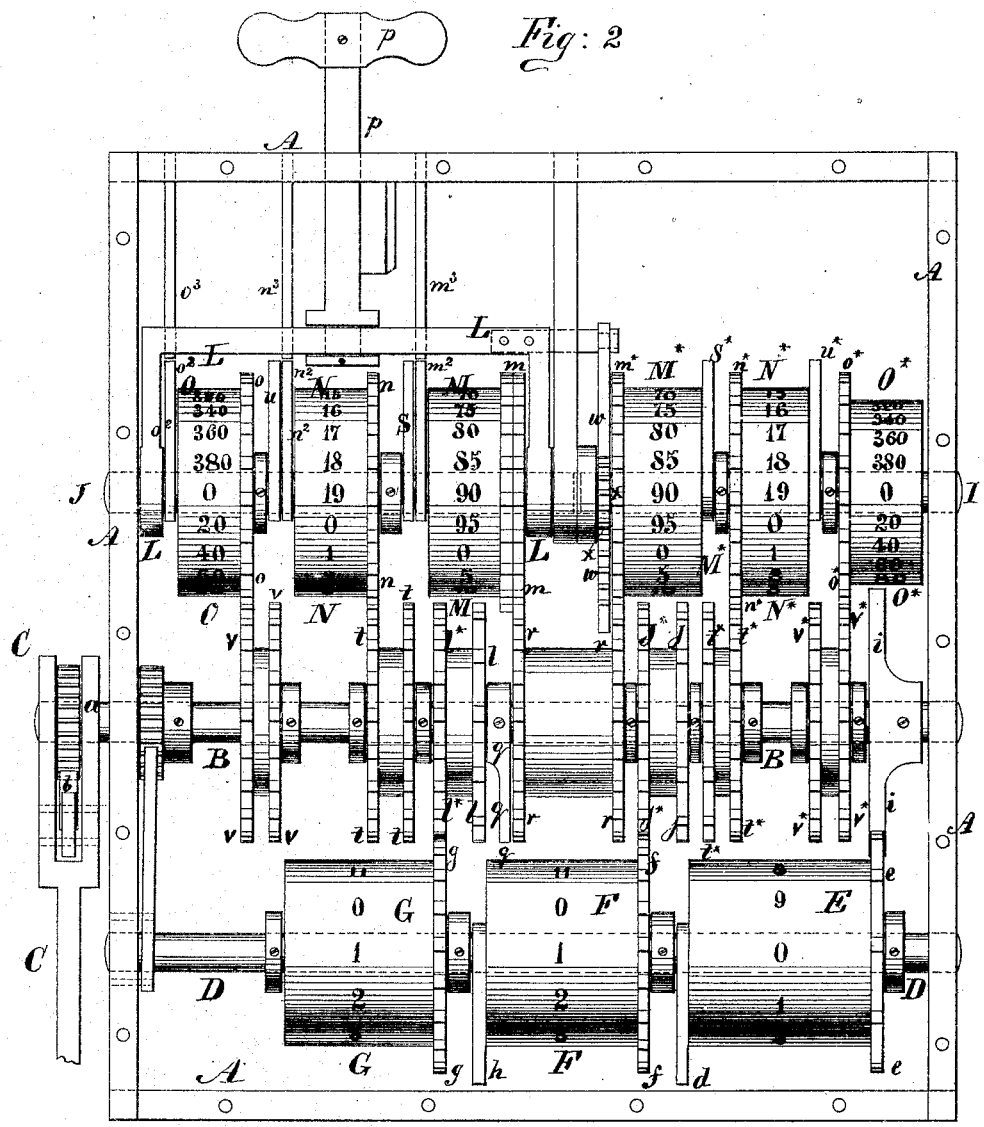

UNITED STATES PATENT OFFICE.

CHRISTIAN DRESCHER AND HEYMANN BLOCH, OF COPENHAGEN, DENMARK.

IMPROVEMENT IN DISTANCE AND FARE REGISTERS.

Specification forming part of Letters Patent No. 157,587, dated December 8, 1874; application filed August 15, 1874.

*To all whom it may concern:*

Be it known that we, CHRISTIAN DRESCHER and HEYMANN BLOCH, both of Copenhagen, in the Kingdom of Denmark, have invented a new and Improved Distance and Tariff Indicator for Cabs and other Wheeled Vehicles, of which the following is a specification:

Figure 1 is an outer face view of our improved distance-indicator, &c. Fig. 2 is a face view of the same, showing it opened.

Similar letters of reference indicate corresponding parts in both the figures.

This invention relates to a new mechanism, which is to be attached to cabs and other vehicles, for recording the distance traveled by the same, and also the proper prescribed amount of money which the driver may by law be authorized to collect, the tariff-recorder being so divided as to show every passenger at the end of his trip how much he is required to pay, besides adding up for the benefit of the proprietor the total amount which the driver was authorized to collect from several passengers during a longer period, such as a day or more.

The invention consists in a novel arrangement and combination of parts, as hereinafter more fully described.

In the accompanying drawing, the letter A represents the case or box within which our improved recording mechanism is contained. This case or box is of rectangular or other suitable form, and made of suitable material, and is rigidly secured within the vehicle whose motion it is to record. B is a shaft, extending across the case A, and having its bearings in the ends thereof, as indicated in Fig. 2. A ratchet-wheel, $a$, is mounted upon the end of the shaft B outside of the box A, and connects with a pawl, $b$, which is pivoted to a connecting-rod, C, which extends from one of the wheels of the vehicle, or from an eccentric thereon or otherwise, to impart intermittent rotary motion to the ratchet-wheel $a$ and shaft B. The number of teeth on the wheel $a$ and the stroke of the rod C should be so regulated with regard to the circumference of the wheel of the vehicle from which they derive their motion that the shaft B will make one revolution whenever the said driving-wheel shall have made a given number of revolutions that equal the progress of the vehicle to be recorded. Thus, if, for example, the driving-wheel has a circumference of ten feet, and the shaft B is to revolve once during every two hundred yards of progress of the vehicle, it follows that the parts C $b$ $a$, or their mechanical equivalents, should be so arranged that whenever the driving-wheel has made sixty revolutions the shaft B will be once turned around its axis. D is a shaft, hung in the case A parallel to B. Upon the shaft D are loosely hung two or more drums, E, F, and G, which are rigidly connected at their ends with toothed wheels $e$, $f$, and $g$, respectively. A projecting finger, $d$, is also rigidly attached to the drum E, and also a projecting finger, $h$, to the drum F. Upon the shaft B is mounted, in line with the toothed wheel $e$, a pair of radially-projecting arms, more or less, $i$ $i$. If there are two such arms $i$ on the shaft B, it follows that once during every half-revolution of the shaft B the wheel $e$ will be moved one tooth, the arm $i$ being of just such length as to reach to the toothed edge of $e$. Now, if the wheel $e$ has ten teeth, it follows that it, and with it the drum E, will make one revolution during five rotations of the shaft B, and one rotation of such drum E would, therefore, according to the above example, record the progress of the vehicle over the distance of one thousand yards. There are figures painted or otherwise marked on the drum E, and one of these figures can be observed through a hole in the cover H of the case A, (see Fig. 1,) said figure indicating the hundreds of yards over which the vehicle may have passed. Whenever the drum E has completed one revolution its finger $d$ takes into a toothed wheel, $j$, which is loose on the shaft B, and whose motion is, by another toothed wheel, $j^*$, with which it is rigidly connected, transmitted to the wheel $f$ and drum F, so that the last-named drum records the thousands of yards, it being marked with figures like E, and observable through a hole in the cover H.

Finally, if desired, the drum F can transmit motion by means of the finger $h$ to a toothed wheel, $l$, which is loose on the shaft B, and rigidly connected with another toothed wheel, $l^*$, that meshes into the wheel $g$, so that thus the drum G is moved to record the ten thousands or twelve thousands, as may be desired.

Now, although we have shown three drums, E F G, on the shaft D, for recording the distances, it is quite evident that two drums may be sufficient for every needful purpose, and that for still greater exactitude four or even more drums may be employed. It is also evident that the motion of the main driving-wheel to the shaft B may be transmitted in such a way that the unit of measure recorded by the drum E may be one foot, ten feet, or one or more meters or yards, or any other suitable measure of distances.

I is a shaft, about half as long as, and hung parallel to, the shaft B in the case A. J is another shaft, which is hung in a sliding frame, L, parallel to B, and so that when said frame is pushed inwardly by means of a handle, $p$, it will bring the shaft J exactly in line with I, so that the two will be like one shaft, as indicated in Fig. 2; but by means of the handle $p$ the frame L can be drawn upward to carry the shaft J farther away from B, and out of line with the shaft I. Upon the shaft J are loosely hung three, more or less, drums, M, N, and O, and an equal number of drums, M*, N*, and O*, is loosely hung upon the shaft I. Toothed wheels $m$, $n$, and $o$ are rigidly connected with the drums M, N, and O, respectively, and toothed wheels $m^*$, $n^*$, and $o^*$ are, respectively, fastened to the drums M*, N*, and O*. A finger, $q$, which is mounted upon the shaft B, catches once during every revolution into the wheel $m$, turning it partly, and with it the drum M. This motion of M is, by the wheel $m$, also transmitted to a connected pair of toothed wheels, $r$ $r$, which are loose on the shaft B, and which mesh, respectively, into the wheels $m$ and $m^*$. Thus, the drums M and M* are moved in equal degree, say one-twentieth of one revolution, during every revolution of the shaft B. When the drum M has completed one revolution a projecting finger, $s$, on it takes into a toothed double wheel, $t$, which is loose on the shaft B, and catches into the wheel $n$, imparting a partial rotation to the drum N. So, also, does, at the same time, a finger, $s^*$, on the drum M* catch into loose wheels $t^*$ on B, which mesh into the wheel $n^*$, thus causing the drums N and N* to be moved in equal degree, and simultaneously. At the end of every complete rotation of the drum N a finger, $u$, on said drum catches into a toothed double wheel, $v$, which is loose on the shaft B, and in gear with the wheel $o$, imparting thus a partial rotation to the drum O. By a finger, $u^*$, and toothed wheels $v^*$, which are loose on B, and mesh into $o^*$, does the drum N* also affect the drum O* in the same degree, and at the same time, as the drum N affects the drum O.

Now, if the peripheries of the drums M and M* are marked with figures, as indicated, say from 0 to 100, in twenty subdivisions, or otherwise, with regard to the price to be charged for the distance that produces one rotation of the shaft B, it follows that these drums will record such price. Thus, if the driver is allowed to charge five cents for every two hundred yards, the drums M M* will record an additional five at every rotation of B; and when the drum M has made one rotation, the drum N marks the first dollar due by the passenger to the driver, &c. The third drum O may be omitted, and, if used, may record every twenty dollars, or other larger amount.

Through openings in the cover H the passenger can always observe how much is due by him to the driver, as the proper figures on the drums M, N, and O are perceptible through such apertures; but the drums M*, N*, and O* are covered by a hinged lid, P, that is locked, as indicated, and to which the proprietor of the vehicle only has access.

Now, when one passenger has left the cab, the driver pulls the handle $p$, and raises the frame L and the shaft J and its appendages; thereby heart-shaped cams, $m^2$, $n^2$, and $o^2$, which are firmly fastened to the drums M, N, and O, respectively, are brought against fixed rods, $m^3$, $n^3$, and $o^3$, that are secured in the case A, as shown. These cams are, by the contact with said rods, turned to their normal positions again, which brings all the drums M, N, and O to zero; but this motion of the frame L, although it affects the drums M N O, does not affect the drums M*, N*, and O*, which retain their position. For a new passenger the frame L is pushed down again, and the drums M, N, and O begin to record anew; but the drums M*, N*, and O* add the amount due by one passenger to what is due by the other, &c. Thus, when the first passenger was to pay two dollars and forty cents for his trip, this fact will be recorded on both sets of drums, but quickly obliterated on the drums M and N after the payment, while the drums M* and N* retain the record. If the next passenger rides far enough to owe the driver three dollars and ten cents, this will become apparent to him by the record of the drums M N; but the drums M* N* will now show that the driver has received five dollars and fifty cents.

Thus it is that the driver is under complete control both of the passenger and of the owner.

If the tariff is such that for every trip the passenger is to pay a certain sum over and above so much per mile or yard, the frame L is provided with a toothed rack, $w$, which actuates a pinion, $x$, on the drum M*, so that whenever the frame L is moved down for a new passenger, the drum M* will at once record the amount due by such passenger apart from mileage.

The tariff may, for example, be fifty cents for every trip above five cents for two hundred yards. The rack $w$ will then turn the drum M* half around to show these fifty cents before M* begins to record the price for distance.

We claim as our invention—

1. The drums M N on the shaft J, hung in the movable frame L, and combined with the drums M* N* on the shaft I for simultaneous action, in the manner specified.

2. The combination of the shafts B D, drums E F, &c., with the shaft J, drums M N, shaft I, drums M* N*, and with the movable frame L, all combined to operate in one instrument, substantially as described, and for the purpose specified.

In testimony whereof we have signed our names to this specification in the presence of the subscribing witnesses.

CHR. DRESCHER. [L. S.]

HEYMANN BLOCH. [L. S.]

Witnesses:
  A. STUNBERG,
  F. PETERSEN.